COMBINED COLOR BURST SEPARATOR AND BLANKING PULSE AMPLIFIER

Filed Nov. 30, 1955

CHARLES H. HEUER
*INVENTOR.*

BY John J. Pederson

HIS ATTORNEY.

United States Patent Office 2,917,575

Patented Dec. 15, 1959

2,917,575

COMBINED COLOR BURST SEPARATOR AND BLANKING PULSE AMPLIFIER

Charles H. Heuer, Glencoe, Ill., assignor to Zenith Radio Corporation, a corporation of Delaware Application November 30, 1955, Serial No. 549,950

3 Claims. (Cl. 178—5.4)

Figures 1, 2:
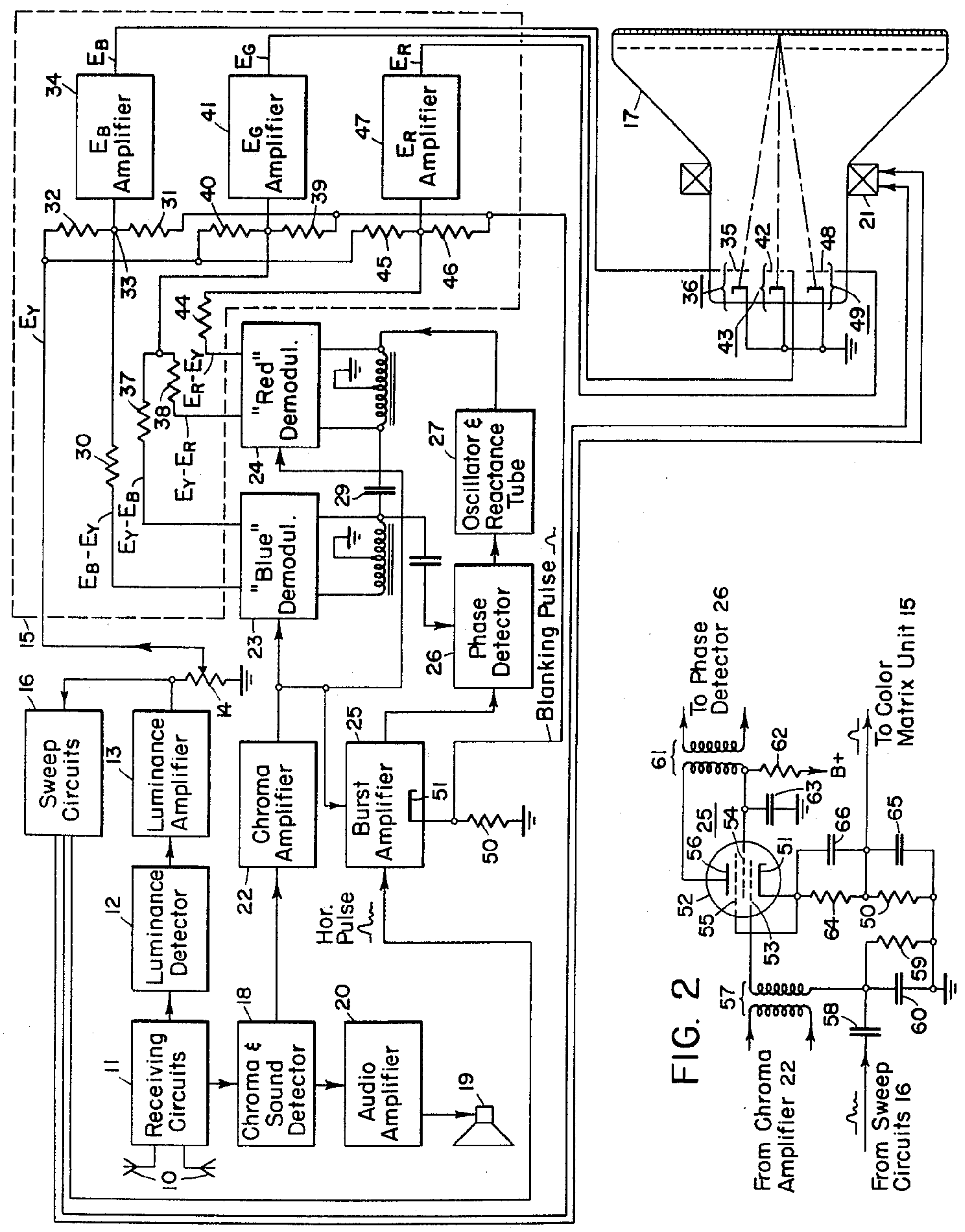

This invention is directed to a new and improved color television receiver and is particularly concerned with color television receiver circuitry which effectively blanks the image reproducer of the receiver during synchronizing-signal intervals.

One of the problems presented by color television receivers is concerned with the desirability of de-energizing or blanking the picture tube or other image reproducer during retrace intervals. At such times, the scansion-synchronizing impulses and color bursts comprising the composite color sync signal frequently cause undesirable visual effects in the reproduced image. For example, during these intervals the electron beam may illuminate a portion of the image screen which should remain darkened and/or may produce light of a completely undesirable color in given areas of the screen.

De-energization of the picture tube during retrace intervals has long been known in the monochrome television art and is usually referred to as "retrace blanking." To achieve this effect, it is customary to apply horizontal-frequency blanking impulses to the image reproducer to cut off the electron beam during intervals coincident with retrace periods and consequently coincident with the occurrence of synchronizing signals in the received telecast. Generally speaking, there is no portion of the receiver circuitry capable of supplying clean, sharp pulses suitable for this purpose; as a consequence, it has been considered necessary to effectuate the desired retrace blanking by means of a clipping amplifier coupled between the horizontal sweep circuits and the image reproducer. This expedient of course, is undesirable in that it requires a separate tube section and adds to the cost of the receiver.

It is an object of the invention, therefore, to provide a new and improved color television receiver in which retrace blanking is effectively and efficiently accomplished.

It is a more specific object of the invention to provide for retrace blanking in a color television receiver without necessitating addition of any electric-discharge devices or other relatively expensive components.

It is another object of the invention to provide a retrace blanking circuit in a color television receiver which effectively de-energizes the image reproducer and does not introduce image errors.

The invention is directed to a color television receiver adapted to reproduce an image in color in response to a received composite color signal including, as components, a chrominance signal, a composite color sync signal, and a luminance signal. These signal designations, as used throughout this specification and in the appended claims, correspond to the definitions of color terms adopted by the Institute of Radio Engineers as set forth in "Proceedings of the IRE," June 1955, pages 742–748. A receiver constructed in accordance with the invention comprises sweep circuits responsive to at least a portion of the composite color sync signal for developing horizontal-frequency scanning signals, and a burst amplifier having input and output circuits. The amplifier includes an electric-discharge device having a cathode, a control electrode, an anode, and circuit means for applying a bias potential to the discharge device to render it normally non-conductive. Coupling means are employed for intercoupling the sweep circuits and the burst amplifier to apply a horizontal-frequency gate signal to the input circuit of the burst amplifier thereby rendering the discharge device conductive during intervals substantially coincident with the horizontal-blanking intervals of the composite color sync signals. The receiver further includes signal circuits comprising means for amplifying the luminance signal and a color demodulating system for utilizing the chrominance signal to develop a plurality of color difference signals. Phase detector means are provided for coupling the output circuit of the burst amplifier to the color demodulating system in order to control the demodulating system in response to at least a portion of the composite color sync signal. An image reproducer is coupled to the signal circuits for utilizing the luminance and the color difference signals to develop a color image while an impedance, coupled to the image reproducer and connected in series with the burst amplifier cathode, develops a blanking signal to provide effective de-energization of the image reproducer during intervals in which the burst amplifier is conductive.

The features of the invention which are believed to be novel are set forth with particularity in the appended claims. The organization and manner of operation of the invention, together with further objects and advantages thereof, may best be understood by reference to the following description taken in conjunction with the accompanying drawings, in which like elements are identified by like numerals in each of the figures, and in which:

Figure 1 is a simplified schematic diagram of a color television receiver constructed in accordance with the invention; and Figure 2 is a detailed schematic diagram of a portion of the blanking circuit of the receiver illustrated in Figure 1.

The color television receiver illustrated in Figure 1 comprises an antenna 10 coupled to conventional receiving circuits 11 which may, for example, comprise the usual radio-frequency amplifier, first detector and intermediate-amplifier stages employed in most monochrome and color television receivers. Receiving circuits 11 are coupled to a luminance detector circuit 12 which, in turn, is connected to a luminance signal amplifier 13. The output stage of luminance amplifier 13, comprising potentiometer 14, is coupled to a color matrix unit enclosed within dash outline 15 and to the usual sweep circuits 16. Sweep circuits 16 are coupled to the deflection system 21 of a color picture tube 17 which may comprise any of the several known varieties of color television picture tube.

Receiving circuits 11 are further coupled to a chrominance and sound detector 18 which is coupled to a speaker 19 by conventional audio circuits 20. Second detector 18 is also coupled to a chrominance channel comprising a chroma amplifier 22; chroma amplifier 22 is coupled to a color demodulating system comprising a pair of synchronous detectors 23 and 24 designated as "blue" and "red" demodulators respectively. The demodulating system may comprise any of the several suitable known types of synchronous detectors capable of demodulating the carrier color signal included in a standard color telecast; a preferred type of color demodulating system is described in the copending application of Robert Adler and John L. Rennick, Serial No. 505,476, filed May 2, 1955, issued January 29, 1957 as Patent 2,779,818, and assigned to the same assignee as the present invention. Each of the two synchronous detectors 23, 24 includes two output circuits; all four of these output circuits are individually coupled to color matrix unit 15.

Chroma amplifier 22 is further coupled to a gated amplifier circuit designated as burst amplifier 25; a gating signal input circuit couples sweep circuits 16 to the burst amplifier. The output of burst amplifier 25 is coupled to a phase detector 26 which is also coupled to a local color-reference oscillator 27; the output stage of phase detector 26 is preferably connected to a reactance tube coupled in the oscillator circuit. Reference oscillator 27 is directly coupled to demodulator 24 and is also coupled to demodulator 23 by means of a capacitor 29 which is utilized to provide a 90° phase difference between the color reference signals applied to the two demodulators.

Matrix unit 15 is utilized to couple the monochrome and chrominance circuits of the receiver to image reproducer 17. The matrix unit includes a pair of resistors 30 and 31 connected in series with each other and incorporated in one of the two output circuits of "blue" demodulator 23. A third resistor 32 is connected between potentiometer 14 and the junction 33 of resistors 30 and 31 to form the first section of the matrix unit. This matrix section is coupled to a first primary-color signal amplifier 34, resistor 31 comprising the principal input impedance of the amplifier. The output of amplifier 34 is coupled to the control electrode 35 of a first electron gun 36 included in image reproducer 17.

Matrix unit 15 further includes a pair of resistors 37 and 38 connected at one end to each other and in series with a resistor 39; the series combination of resistors 37 and 39 comprises the output impedance of the second output circuit of demodulator 23 and resistors 38 and 39 comprise the output impedance of one of the two output stages of demodulators 24. An additional resistor 40 is connected in series with impedance 39 and is employed to couple resistor 39 to luminance amplifier 13. Resistor 39 comprises the principal input impedance of a second primary signal amplifier 41 which is coupled to the control electrode 42 of a second electron gun 43 included in picture tube 17. Matrix unit 15 also includes a third matrix section comprising a pair of resistors 44 and 45 individually connected in series with an additional resistor 46 which comprises the principal input impedance of a third primary color signal amplifier 47. The series combination of resistors 44 and 46 comprises the output impedance of the second output circuit of "red" demodulator 24; resistor 45 is connected back to the output circuit of luminance amplifier 13. The output of amplifier 47 is coupled to the control electrode 48 of a third electron gun 49 included in picture tube 17.

As thus far described, the color television receiver circuit of Figure 1 is in most respects quite conventional; accordingly, a brief description of its operation will be adequate. A received signal is intercepted by antenna 10 and suitably amplified and detected in receiving circuits 11, after which it is supplied to second detectors 12 and 18. After detection in circuit 12, the video signal is applied to amplifier 13 and, after amplification, is utilized in sweep circuits 16 to develop the usual horizontal- and vertical-frequency sweep signals which are supplied to deflection system 21 of picture tube 17. At the same time, that portion of the detected signal generally representative of the luminance ($E_Y$) signal included in a color telecast is supplied to color matrix 15. The detected signal output from second detector 18 is utilized by audio circuits 20 and speaker 19 to reproduce the sound portion of the received telecast. The output signal from second detector 18 is also translated through chroma amplifier 22 to the demodulating system comprising detectors 23 and 24; in accordance with conventional practice, the frequency response characteristics of the chroma amplifier may be made such that only the portion of the received signal generally corresponding to the chrominance signal and to the high-frequency luminance signal components is translated to the color demodulators.

A color reference signal having the same frequency as the color subcarrier is supplied in proper phase to each of demodulators 23 and 24 to permit synchronous detection of the chrominance signal and develop four color difference output signals of the form $E_B-E_Y$, $E_Y-E_B$, $E_R-E_Y$ and $E_Y-E_R$ respectively. The color difference signals are supplied to matrix unit 15 where they are combined in the proper ratios with luminance signal $E_Y$ to form primary color signals $E_B$, $E_G$ and $E_R$ which are amplified in circuits 34, 41, and 47 respectively and utilized to control operation of picture tube 17. Thus, matrix unit 15 and picture tube 17 comprise an image reproducer which utilizes the color difference and luminance signals to develop the desired color image. For a detailed explanation of the operation of demodulators 23 and 24 and matrix unit 15, reference may be made to the aforementioned copending application of Robert Adler and John L. Rennick. The color burst signal included in the received telecast is amplified in gated amplifier 25 and is compared in phase and frequency with the reference signal from oscillator 27 in the AFC phase detector 26; the output of the phase detector is applied to the reactance tube section of oscillator 27 to control the oscillator frequency in the usual manner.

The basic circuitry of the television receiver of Figure 1 is subject to substantial variation without in any way effecting operation of the invention. For example, demodulators 23 and 24 may be made to develop output signals corresponding to different color difference signals than those designated, such as $E_I$, $E_Q$, or $E_G-E_Y$. Moreover, color matrix unit 15 may be eliminated in which case picture tube 17 is directly connected to the demodulator output circuits and is controlled by direct application of the luminance and color difference signals in known fashion. If a sequential-display device is utilized for picture tube 17, additional circuitry may be required to gate the information signal inputs and to control the sequence of color presentation at the image reproducer. Any of these and similar modifications may be made in a color television receiver constructed in accordance with the invention without affecting it in any way.

In receivers constructed in accordance with conventional practice, the three matrix circuit sections are returned to a common plane of reference potential and a separate clipping amplifier circuit is employed to derive horizontal frequency pulses from sweep circuit 16. These pulses are applied to the image reproducer for blanking purposes. In the receiver of Figure 1, however, no separate circuit is required for this purpose; instead, a source of cleanly clipped horizontal-frequency pulses already present in the receiver is utilized for this purpose. This source comprises the cathode circuit of burst amplifier 25. Retrace blanking is achieved simply by employing a small resistor 50 in series with the cathode 51 of the burst amplifier; the terminal of the resistor 50 which is connected to cathode 51 is also connected to the load impedance of each of the output circuits of the color demodulators. The other terminal of resistor 50 is connected to a plane of reference potential here shown as ground.

Operation of the blanking circuit of the receiver is simplicity itself. Burst amplifier 25 is necessarily a clipping amplifier, since it is essential that the color synchronizing signal be translated to phase detector 26 without distortion and to the exclusion of any of the chrominance signal. Consequently, the series resistor 50 in the cathode circuit provides an excellent source of cleanly clipped positive-going horizontal-frequency voltage pulses. These pulses are characterized by the absence of "ring" due to the clipping action of the burst amplifier, as contrasted with the waveforms of horizontal-frequency impulses available in other portions of the receiver. Because resistor 50 is incorporated in the input circuit of each of amplifiers 34, 41 and 47, the pulses are inverted in phase and amplified in these circuits and applied to control electrodes 34, 42 and 48 of image reproducer 17 as negative-going pulses substantially coincident with the horizontal-blanking intervals of the composite color sync signal. These negative pulses effectively cut off each of the electron beams during retrace intervals, since retrace time corresponds to the time of occurrence of the horizontal-blanking intervals. Consequently, effective retrace blanking is achieved without requiring any substantial addition to the circuitry of the receiver and without introducing any undesired visual effects into the image reproduced by device 17.

Figure 2 shows a particular circuit for burst amplifier 25 adapted for use in a receiver constructed in accordance with the invention. The burst amplifier comprises an electron-discharge device 52, preferably of the pentode type; tube 52 comprises a control electrode 53, a screen grid 54, a suppressor electrode 55 and an anode 56 in addition to cathode 51. Control electrode 53 is coupled to chroma amplifier 22 by means of a coupling transformer 57; the control grid is also coupled to the horizontal output transformer of sweep circuit 16 (not shown) by means of a coupling capacitor 58 and an input resistor 59, resistor 59 being by-passed for radio frequencies by capacitor 60. The burst amplifier is coupled to phase detector 26 by means of a coupling transformer 61, the primary winding of which is connected between anode 56 and screen grid 54. Anode 56 and screen grid 54 are also connected to a source of positive unidirectional operating potential B+ by means of a resistor 62, resistor 62 being by-passed for radio frequencies by a capacitor 63. Suppressor electrode 55 is connected to cathode 51. A bias resistor 64 and blanking impedance 50 are connected in series with each other and are connected between cathode 51 and ground. Separate by-pass capacitors 65 and 66 are provided for resistors 50 and 64 respectively. The cathode side of blanking impedance 50 is connected to color matrix unit 15 as in Figure 1.

In operation, the composite chrominance and color sync signal from amplifier 22 is applied to control grid 53 of tube 52; however, the tube is biased to be normally non-conductive. A horizontal-frequency gating signal comprising flyback pulses derived from sweep circuits 16 is applied to the control grid to render tube 52 conductive only during intervals substantially coincident with the horizontal-blanking intervals of the composite color sync signal. The bias on the amplifier is adjusted so that it functions as a clipping amplifier; that is, tube 52 conducts only during the major portion of each horizontal-frequency flyback pulse and does not conduct during the trace or picture portion of the horizontal-frequency cycle when objectionable ringing components are present in the flyback pulse waveform. Consequently, clipped voltage pulses corresponding in time to the gating pulses are developed across blanking resistor 50 and are supplied to color matrix unit 15. These clipped horizontal-frequency pulses effectively de-energize picture tube 17 (Figure 1) during intervals when discharge device 52 is conductive.

In a typical example, which is set forth here purely by way of illustration and in no sense as a limitation on the invention, the circuit elements of burst amplifier 25 are as follows:

| | |
|---|---|
| Tube **52** | 6AU6 |
| Bias resistor **64**____ohms__ | 10,000 |
| Capacitor **66**____microfarads__ | 0.1 |
| Blank resistor **50**____ohms__ | 39 |
| Capacitor **65**____microfarads__ | 0.001 |
| B+ ____volts__ | 400 |

The circuit of Figure 2 thus provides a specific example of a burst amplifier circuit which may be employed to develop the desired clipped blanking pulses without requiring incorporation of a separate stage in the receiver for this purpose.

While particular embodiments of the present invention have been shown and described, it will be obvious to those skilled in the art that changes and modifications may be made without departing from the invention in its broader aspects. Accordingly, the aim in the appended claims is to cover all such changes and modifications as fall within the true spirit and scope of the invention.

I claim:

1. A color television receiver adapted to reproduce an image in color in response to a received composite color signal including, as components, a luminance signal, a chrominance signal and a composite color sync signal, said receiver comprising: sweep circuits responsive to at least a portion of said composite color sync signal for developing horizontal-frequency scanning signals; a burst amplifier having input and output circuits and including an electric-discharge device having a cathode, a control electrode and an anode and further including circuit means for applying a bias potential to said discharge device to render said device normally non-conductive; coupling means intercoupling said sweep circuits and said burst amplifier to apply a horizontal-frequency gate signal to said input circuit of said amplifier to render said discharge device conductive during intervals substantially coincident with the horizontal-blanking intervals of said composite color sync signal; signal circuits including means for amplifying said luminance signal and a color demodulating system for utilizing said chrominance signal to develop a plurality of color difference signals; phase detector means coupled between said output circuit of said burst amplifier and said color demodulating system for controlling said demodulating system in response to at least a portion of said composite color sync signal; an image reproducer coupled to said signal circuits for utilizing said luminance and color difference signals to develop an image in color; and impedance means coupled to said image reproducer and connected in series with said burst amplifier cathode for developing a blanking signal to provide for effective de-energization of said image reproducer during intervals in which said burst amplifier is conductive.

2. A color television receiver adapted to reproduce an image in color in response to a received composite color signal including, as components, a luminance signal, a chrominance signal and a composite sync signal, said receiver comprising: sweep circuits responsive to at least a portion of said composite color sync signal for developing horizontal-frequency scanning signals; a burst amplifier having input and output circuits and including an electric-discharge device having a cathode, a control electrode and an anode, and further including circuit means for applying a bias potential to said discharge device to render said device normally non-conductive; coupling means intercoupling said sweep circuits and said burst amplifier to apply a horizontal-frequency gate signal to said input circuit of said amplifier to render said discharge device conductive only during intervals substantially coincident with the horizontal-blanking intervals of said composite color sync signal; signal circuits including means for amplifying said luminance signal and a color demodulating system for utilizing said chrominance signal to develop a plurality of color difference signals, said demodulating system including a corresponding plurality of output circuits each including an output impedance; phase detector means coupled between said output circuit of said burst amplifier and said color demodulating system for controlling said demodulating system in response to at least a portion of said composite color sync signal; an image reproducer coupled to said amplifying means of said signal circuits for utilizing said luminance signal and to said output circuits of said demodulating system to develop an image in color; and impedance means coupled between each of said output impedances and a plane of reference potential to form a common return for all of said output circuits, said impedance means being connected in series with said burst amplifier cathode for developing a blanking signal to provide for effective de-energization of said image reproducer during intervals in which said burst amplifier is conductive.

3. A color television receiver adapted to reproduce an image in color in response to a received composite color signal including, as components, a luminance signal, a chrominance signal and a composite sync signal, said receiver comprising: sweep circuits responsive to at least a portion of said composite color sync signal for developing horizontal-frequency scanning signals; a burst amplifier having input and output circuits and including an electric-discharge device having a cathode, a control electrode and an anode, and further including circuit means for applying a bias potential to said discharge device to render said device normally non-conductive; coupling means intercoupling said sweep circuits and said burst amplifier to apply a horizontal-frequency gate signal to said input circuit of said amplifier to render said discharge device conductive only during intervals substantially coincident with the horizontal-blanking intervals of said composite color sync signal; signal circuits including means for amplifying said luminance signal and a color demodulating system for utilizing said chrominance signal to develop a plurality of color difference signals, said demodulating system including a corresponding plurality of output circuits each including an output impedance; a color matrix unit, including said output impedances of said demodulating system, for combining said color difference signals with said luminance signal to develop a plurality of primary color control signals; phase detector means coupled between said output circuit of said burst amplifier and said color demodulating system for controlling said demodulating system in response to at least a portion of said composite color sync signal; an image reproducer coupled to said color matrix unit to develop an image in color; and impedance means coupled between each of said output impedances and a plane of reference potential to form a common return for all of said output circuits, said impedance means being connected in series with said burst amplifier cathode for developing a blanking signal to provide for effective de-energization of said image reproducer during intervals in which said burst amplifier is conductive.

References Cited in the file of this patent

Introduction to Color TV, M. Kaufman and H. Thomas, John F. Rider Publisher, Inc., New York, received in Scientific Library September 27, 1954, Schematic Diagram of GE Color TV Receiver.

RCA CT–100, Chassis #CTC 2, Mfr. #274, 1954, #T3, first printing March 31, 1954.